United States Patent
Kirby et al.

(10) Patent No.: US 11,851,380 B2
(45) Date of Patent: Dec. 26, 2023

(54) SLURRY PROCESSING FOR DEPOSITION OF RARE EARTH HAFNIUM TANTALATE BASED BARRIER COATINGS

(71) Applicant: General Electric Company, Schenectady, NY (US)

(72) Inventors: Glen Harold Kirby, Liberty Township, OH (US); Evin Nathaniel Barber, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 16 days.

(21) Appl. No.: 17/330,514

(22) Filed: May 26, 2021

(65) Prior Publication Data

US 2022/0380268 A1    Dec. 1, 2022

(51) Int. Cl.
    *C04B 41/00* (2006.01)
(52) U.S. Cl.
    CPC .... *C04B 41/009* (2013.01); *C04B 2235/3224* (2013.01)
(58) Field of Classification Search
    CPC ........... C04B 41/009; C04B 2235/3224; F05D 2230/22; F01D 5/288
    See application file for complete search history.

(56) References Cited

U.S. PATENT DOCUMENTS

| | | | |
|---|---|---|---|
| 4,419,416 A | 12/1983 | Gupta et al. | |
| 4,585,481 A | 4/1986 | Gupta et al. | |
| 6,159,553 A | 12/2000 | Li et al. | |
| 6,582,779 B2 | 6/2003 | Li et al. | |
| 6,777,093 B1 | 8/2004 | Ojard et al. | |
| 6,902,836 B2 | 6/2005 | Eaton et al. | |
| 7,060,360 B2 | 6/2006 | Eaton et al. | |
| 7,063,894 B2 | 6/2006 | Sun et al. | |
| 7,638,178 B2 | 12/2009 | Raybould et al. | |

(Continued)

FOREIGN PATENT DOCUMENTS

| JP | 2010235415 A | * 10/2010 |
|---|---|---|
| JP | 2010235415 A | 10/2010 |

OTHER PUBLICATIONS

Patent Application Publication No. JP 2010-235415 (Mori) and online publication "Tailoring the microwave dielectric properties of GdTiNb1—xTax06 and Sm1—xYxTiTa06 ceramics", Surendran et al., Journal of the European Ceramic Society 23, 2003, pp. 2489-2495 (Surendran) (Year: 2003).*

(Continued)

*Primary Examiner* — Humera N. Sheikh
*Assistant Examiner* — Kevin Ct Li
(74) *Attorney, Agent, or Firm* — Dority & Manning, P.A.

(57) ABSTRACT

Methods of forming sintered coatings are provided, along with the resulting coatings on a substrate. The sintered coating may comprise a rare earth compound and a sintering aid, with the rare earth compound has the formula: $A_{1-b}B_bZ_{1-d}D_dMO_6$ where A is Al, Ga, In, Sc, Y, Ce, Pr, Nd, Pm, Sm, Eu, Gd, Tb, Dy, Ho, Er, Tm, Yb, Lu, Fe, Cr, Co, Mn, Bi, or a mixture thereof; b is 0 to about 0.5; Z is Hf, Ti, or a mixture thereof; D is Zr, Ce, Ge, Si, or a mixture thereof; d is 0 to about 0.5; and M is Ta, Nb, or a mixture thereof. The coating may be densified at a sintering temperature, such as 1300° C. to 1600° C.

20 Claims, 2 Drawing Sheets

(56) References Cited

U.S. PATENT DOCUMENTS

| | | | |
|---|---|---|---|
| 7,740,960 | B1 | 6/2010 | Zhu et al. |
| 8,343,589 | B2 | 1/2013 | Kirby et al. |
| 8,501,840 | B2 | 8/2013 | Kirby et al. |
| 8,673,400 | B2 | 3/2014 | Kirby et al. |
| 9,005,716 | B2 | 4/2015 | Kirby et al. |
| 9,023,435 | B2 | 5/2015 | Kirby et al. |
| 9,133,719 | B2 | 9/2015 | Witz et al. |
| 9,139,480 | B2 | 9/2015 | Raybould et al. |
| 9,676,674 | B2 | 6/2017 | Lazur |
| 9,714,578 | B2 | 7/2017 | Kirby |
| 9,890,089 | B2 | 2/2018 | Kirby et al. |
| 10,696,601 | B2 | 6/2020 | Kirby |
| 10,822,285 | B2 | 11/2020 | Kirby |
| 2006/0280953 | A1* | 12/2006 | Hazel ............... C23C 28/3455 428/701 |
| 2011/0027470 | A1* | 2/2011 | Kirby .................. C04B 41/89 427/142 |
| 2012/0219808 | A1* | 8/2012 | Raybould ............. F01D 5/288 428/446 |
| 2016/0153288 | A1 | 6/2016 | Luthra |
| 2019/0062227 | A1* | 2/2019 | Kirby ................. C04B 41/009 |

OTHER PUBLICATIONS

"Microwave dielectric properties of RETiTaO6 ceramics", Solomon et al., J. Mater. Res., vol. 17, No. 10, Oct. 2002 (Solomon) (Year: 2002).*

Su et al., Phase relations, crystal structure, and phase transformation of $In_{1-x}Nb_{1-x}Ti_{2x}O_4$ ($0 \leq x < 0.45$) in $In_2O_3$—$Nb_2O_5$—$TiO_2$ system, Journal of Alloys and Compounds, 651, Aug. 2015, pp. 97-105.

Surendran et al., Microwave dielectric properties of RETiTaO6 (RE = La, Ce, Pr, Nd, Sm, Eu, Gd, Tb, Dy, Ho, Y, Er, Yb, Al, and In) ceramics, Journal of materials research, ResearchGate, vol. 17, Issue 10, Oct. 2002, pp. 2561-2566. https://www.researchgate.net/publication/231917997.

John et al., Dielectric properties of nano crystalline LnTiNbO6 (Ln = Ce, Pr, Nd, Sm, Gd, Dy, Er, Yb) ceramics, IOP Conference Series: Materials Science and Engineering, conference 1, vol. 73, 2015, pp. 1-5. http://iopscience.jop.org/1757-899X/73/1/012011.

Holcombe et al., Survey study of low-expanding high-melting, mixed oxides, No. Y-1913, Oak Ridge Y-12 Plant, Tenn, 1974. https://www.osti.gov/scitech/servlets/purl/4309451.

* cited by examiner

SLURRY PROCESSING FOR DEPOSITION OF RARE EARTH HAFNIUM TANTALATE BASED BARRIER COATINGS

FIELD

Embodiments of the present invention generally relate to environmental barrier coatings for ceramic components, along with methods of making the same.

BACKGROUND

Higher operating temperatures for gas turbine engines are continuously being sought in order to improve their efficiency. However, as operating temperatures increase, the high temperature durability of the components of the engine must correspondingly increase. Significant advances in high temperature capabilities have been achieved through the formulation of iron, nickel, and cobalt-based superalloys. Still, with many hot gas path components constructed from supper alloys, thermal barrier coatings (TBCs) can be utilized to insulate the components and can sustain an appreciable temperature difference between the load-bearing alloys and the coating surface, thus limiting the thermal exposure of the structural component.

While superalloys have found wide use for components used throughout gas turbine engines, and especially in the higher temperature sections, alternative lighter-weight substrate materials have been proposed, such as ceramic matrix composite (CMC) materials. CMC and monolithic ceramic components can be coated with environmental barrier coatings (EBCs) to protect them from the harsh environment of high temperature engine sections. EBCs can provide a dense, hermetic seal against the corrosive gases in the hot combustion environment.

Silicon carbide and silicon nitride ceramics undergo oxidation in dry, high temperature environments. This oxidation produces a passive, silicon oxide scale on the surface of the material. In moist, high temperature environments containing water vapor, such as a turbine engine, both oxidation and recession occurs due to the formation of a passive silicon oxide scale and subsequent conversion of the silicon oxide to gaseous silicon hydroxide, which results in dimensional loss of the material. For component applications of silicon-based substrates in turbine engines, such material loss can open up clearances and may lead to efficiency losses, and ultimately may lead to perforation of the component.

As such, an environmental barrier coating (EBC) is applied onto the surface of the ceramics to help protect the underlying component. Current materials commonly used for environmental barrier coatings on CMC's include celsian-phase barium strontium aluminosilicate (BSAS) and rare earth silicates. All of these materials are relatively stable in steam compared to the CMC and can prevent penetration of steam to the CMC if present as a dense coating layer.

However, these materials have varying resistance against molten environmental contaminant compositions, particularly those containing oxides of calcium, magnesium, aluminum, silicon, and mixtures thereof. Dirt, ash, and dust ingested by gas turbine engines, for instance, are often made up of such compounds, which often combine to form contaminant compositions comprising mixed calcium-magnesium-aluminum-silicon-oxide systems (Ca—Mg—Al—Si—O), hereafter referred to as "CMAS." At the high turbine operating temperatures, these environmental contaminants can adhere to the hot barrier coating surface, and thus cause damage to the EBC. For example, CMAS can form compositions that are liquid or molten at the operating temperatures of the turbines. The molten CMAS composition can dissolve the barrier coating, or can fill its porous structure by infiltrating the pores, channels, cracks, or other cavities in the coating. Upon cooling, the infiltrated CMAS composition solidifies and reduces the coating strain tolerance, thus initiating and propagating cracks that may cause delamination and spalling of the coating material.

In particular, molten dust reacts strongly with B SAS to form a low temperature eutectic and phases that are not stable in steam. Molten dust is less corrosive against rare earth silicates. Some rare earth silicates (e.g. those comprised of gadolinium, erbium, and yttrium) react with the molten dust to form highly refractory "apatite" phases. Others rare earth silicates allow CMAS penetration but do not suffer melt point suppression. All rare earth silicates, however, are mechanically weakened by their interaction with molten dust, such that subsequent erosion and impact events can more easily take off the coating.

A need exists, therefore, for coating compositions that are less susceptible to molten dust attack, and also less susceptible to subsequent gas erosion, particle erosion, and particle impact over the current state-of-the-art EBC materials.

BRIEF DESCRIPTION

Aspects and advantages will be set forth in part in the following description, or may be obvious from the description, or may be learned through practice of the invention.

Methods are generally provided for forming a coating on a surface of a substrate (e.g., a CMC substrate). In one embodiment, the method includes applying a slurry onto the surface of the substrate to form a coating and densifying the coating at a sintering temperature (e.g., about 1300° C. to about 1600° C., such as about 1300° C. to about 1500° C., or about 1300° C. to about 1450° C.). Prior to applying the slurry, a bond coating may be formed on the surface of the substrate.

The slurry includes a rare earth compound dispersed within a solvent, wherein the rare earth compound has the formula:

$$A_{1-b}B_bZ_{1-d}D_dMO_6$$

where A is Al, Ga, In, Sc, Y, Ce, Pr, Nd, Pm, Sm, Eu, Gd, Tb, Dy, Ho, Er, Tm, Yb, Lu, Fe, Cr, Co, Mn, Bi, or a mixture thereof; b is 0 to about 0.5; Z is Hf, Ti, or a mixture thereof; D is Zr, Ce, Ge, Si, or a mixture thereof; d is 0 to about 0.5; and M is Ta, Nb, or a mixture thereof. In particular embodiments, the slurry further comprises a sintering aid.

Sintered coatings are also generally provided, such as coatings on a substrate (e.g., a CMC substrate). The sintered coating may comprise a rare earth compound and a sintering aid, wherein the rare earth compound has the formula: $A_{1-b}B_bZ_{1-d}D_dMO_6$ where A is Al, Ga, In, Sc, Y, Ce, Pr, Nd, Pm, Sm, Eu, Gd, Tb, Dy, Ho, Er, Tm, Yb, Lu, Fe, Cr, Co, Mn, Bi, or a mixture thereof; b is 0 to about 0.5; Z is Hf, Ti, or a mixture thereof; D is Zr, Ce, Ge, Si, or a mixture thereof; d is 0 to about 0.5; and M is Ta, Nb, or a mixture thereof. In one embodiment, the sintering aid dissolves into the rare earth compound during sintering such that the sintering aid is undetectable in the sintered coating as a separate phase. In an alternative embodiment, a majority of the sintering aid dissolves into the rare earth compound to form a continuous phase while an excess portion of the sintering aid dissolves into the rare earth compound to form a discrete sintering aid-rich phase dispersed within the continuous phase.

These and other features, aspects and advantages will become better understood with reference to the following description and appended claims. The accompanying drawings, which are incorporated in and constitute a part of this specification, illustrate embodiments of the invention and, together with the description, serve to explain certain principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended Figs., in which.

Figure 1:
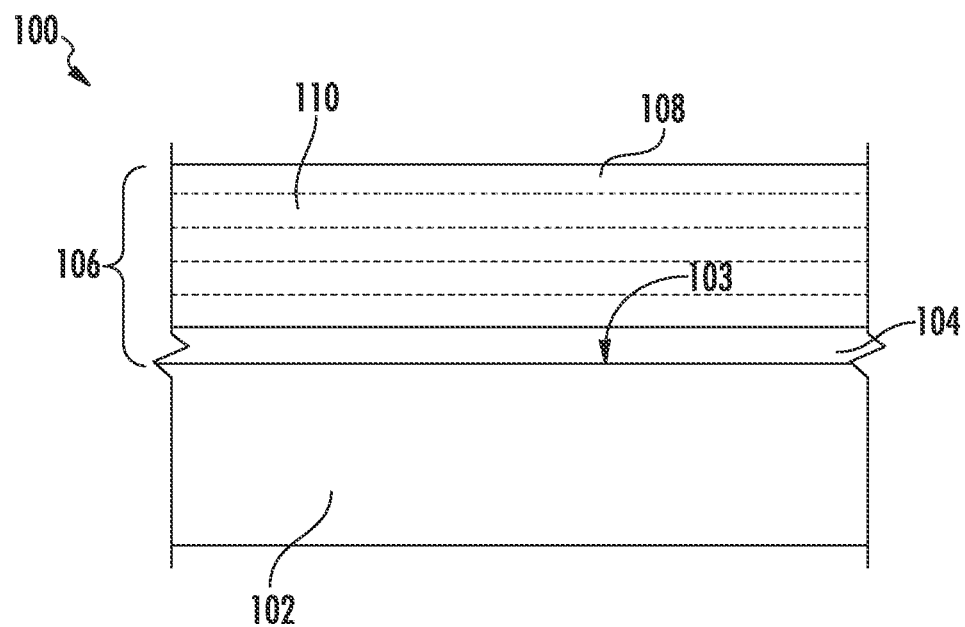
FIG. 1 shows an exemplary coated component having a substrate with a coating system thereon

Repeat use of reference characters in the present specification and drawings is intended to represent the same or analogous features or elements of the present invention.

DETAILED DESCRIPTION OF PARTICULAR EMBODIMENTS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In the present disclosure, when a layer is being described as "on" or "over" another layer or substrate, it is to be understood that the layers can either be directly contacting each other or have another layer or feature between the layers, unless expressly stated to the contrary. Thus, these terms are simply describing the relative position of the layers to each other and do not necessarily mean "on top of" since the relative position above or below depends upon the orientation of the device to the viewer.

As used herein, the term "barrier coating(s)" can refer to environmental barrier coatings. The barrier coatings herein may be suitable for application to "ceramic components," or simply "components," found in high temperature environments (e.g. operating temperatures of about 2500° C.), such as those present in gas turbine engines. Examples of such components can include, for example, combustor components, turbine blades, shrouds, nozzles, heat shields, and vanes.

Chemical elements are discussed in the present disclosure using their common chemical abbreviation, such as commonly found on a periodic table of elements. For example, hydrogen is represented by its common chemical abbreviation H; helium is represented by its common chemical abbreviation He; and so forth. As used herein, "Ln" refers to a rare earth element or a mixture of rare earth elements. More specifically, the "Ln" refers to the rare earth elements of scandium (Sc), yttrium (Y), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu), or mixtures thereof.

A slurry deposition process is generally provided for forming a coating on a surface of a substrate. The slurry deposition process generally involves applying a slurry that includes a rare earth compound dispersed within a solvent. For example, rare earth hafnium tantalate-based materials are showing to be highly refractory, recession resistant, erosion resistant, and molten dust resistant. As such, these materials show potential to serve as the outermost layer of an EBC to promote durability in hot and harsh engine environments, such as within the hot gas path of a turbomachine. In particular, these rare earth compounds are compatible with mullite-based bond coats, as opposed to the current rare earth silicates that are not compatible with mullite.

Referring now to the drawings, FIG. 1 shows an exemplary coated component 100 with a substrate 102 having a coating system 106 thereon formed using the slurry and sintering process. Generally, the coating system 106 includes an optional bond coating 104 on the surface 103 of the substrate and an EBC 108 on the optional bond coating 104. In the embodiment shown, the bond coating 104 is directly on the surface 103 without any layer therebetween. However, in other embodiments, one or more layers can be positioned between the bond coating 104, when present, and the surface 103. In other embodiments, the EBC 108 may be formed directly on the surface 103 of the substrate 102.

The EBC 108 may include any combination of one or more layers 110 formed from materials selected from typical EBC or thermal barrier coating ("TBC") layer chemistries, including but not limited to rare earth silicates (e.g., monosilicates and di-silicates), aluminosilicates (e.g., mullite, barium strontium aluminosilicate (BSAS), rare earth aluminosilicates, etc.), hafnia, zirconia, stabilized hafnia, stabilized zirconia, rare earth hafnates, rare earth zirconates, rare earth gallium oxide, etc.

According to one particular embodiment, the rare earth compound (e.g., as in Formula 1 discussed below) may be applied via a slurry deposition to form at least one of the layers 110 of the EBC 108. In the slurry deposition process, a slurry is applied over the surface 103 of the substrate (and any layer thereon, such as bond coating 104 or outer layer 110 of the EBC 108) to form a coating thereon, with the slurry including the rare earth compound and a sintering aid dispersed within a solvent or solvent system. For instance, solvents may include water, an alcohol, an organic solvent, or mixtures thereof.

The slurry deposition process may include one or more cycles that include slurry formation, slurry application, drying, and sintering, with optional masking, leveling, sintering aid infiltration, mask removal, and organic processing aid burnout steps. The average thickness per slurry deposition cycle depends primarily on the slurry solids loading, sintering aid concentration, and number of dip, spray, or paint passes.

The slurry composition may generally comprise a mixture including water, the rare earth compound in the form of a plurality of particles, a sintering aid, and other option components such as a dispersant, plasticizer, surfactant, dispertion aid, binders, etc. For example, the rare earth compound may be in the form of a plurality of particles having a particle size distribution of D50 of about 0.2 μm to about 2 μm and D95 of about 10 μm to about 30 μm. Such fine particle size distribution can sinter to a dense layer in a reasonable amount of time (i.e. less than about 24 hours). In an alternate embodiment, the distribution can be bimodal, wherein from about 0.1 vol. % to about 40 vol % of the particles have a larger size described by the following distribution: D50 of about 10 μm to about 30 μm and D95 up to about 100 μm. Having up to about 40% larger sized particles in a bimodal distribution will allows for the formation of thicker layers with each coating pass without rendering "sluggish" (i.e. greater than about 24 hours) sintering behavior.

Generally, the rare earth compound described herein are less susceptible to molten dust, erosion, impact, and/or mixed mode degradation mechanisms than current EBC compositions. Thus, the rare earth compounds may result in a more robust EBC, compared to current-state-of-the-art EBC, that remains on the substrate material to protect it from recession against water vapor in turbine engine environments. In summary, these rare earth compounds exhibit better resistance against molten dust as compared to BSAS and rare earth silicate EBC materials, and may have higher hardness than BSAS and rare earth silicate materials, particular after exposure to molten dust (e.g., CMAS). Thus, the rare earth compounds add resistance to particle erosion and impact to a coating formed from such materials (e.g., an EBC).

In accordance with one particular embodiment, the rare earth compound used in the slurry deposition process to form at least one layer 110 of the EBC 108 has the formula:

$$A_{1-b}B_bZ_{1-d}D_dMO_6 \quad \text{(Formula 1)}$$

where A is Al, Ga, In, Sc, Y, Ce, Pr, Nd, Pm, Sm, Eu, Gd, Tb, Dy, Ho, Er, Tm, Yb, Lu, Fe, Cr, Co, Mn, Bi, or a mixture thereof; b is 0 to about 0.5 (e.g., 0 to about 0.2, such as greater than 0 to about 0.5 or about 0.001 to about 0.2); Z is Hf, Ti, or a mixture thereof; D is Zr, Ce, Ge, Si, or a mixture thereof; d is 0 to about 0.5 (e.g., 0 to about 0.2, such as about 0.001 to about 0.5 or about 0.001 to about 0.2); and M is Ta, Nb, or a mixture thereof. Compounds of Formula 1 may exhibit properties that are similar or better than existing BSAS and rare earth silicate materials in terms of stability in high temperature steam. Additionally, these materials may exhibit better resistance against molten dust as compared to BSAS and rare earth silicate EBC materials. Furthermore, these materials may have higher hardness than BSAS and rare earth silicate materials, particularly after exposure to molten dust. This results in the coating being more resistant to particle erosion and impact.

Generally, the compound having the Formula 1 may have multiple phases in the layer 110, such as an orthorhombic phase (e.g., with Pbcn or Pnma space groups), a tetragonal phase (e.g., with P4$_2$/mnm), or a monoclinic phase (e.g., with P2/c). As such, these materials may have a structure that is completely different (in terms of phase) than TBC layers formed from material containing hafnium oxides or zirconium oxides, which typically have the phase P21/c for monoclinic hafnia and monoclinic zirconia, or the phase P4$_2$/nmc for tetragonal hafnia and zirconia, or the cubic structure for hafnia and zirconia.

It is to be understood that the compound has distinct "sites" in its composition, with the "A site" being formed by A and/or B of Formula 1, the "Z site" being formed by Z and/or D of Formula 1, the "M site," and the oxygens.

In certain embodiment, the compound may include a single element in the "A site" such that b is 0 and A is an element selected from the group consisting of Al, Ga, In, Sc, Y, Ce, Pr, Nd, Pm, Sm, Eu, Gd, Tb, Dy, Ho, Er, Tm, Yb, Lu, Fe, Cr, Co, Mn, and Bi. In one exemplary embodiment, when b is 0 and A is Al, the compound is: $AlZ_{1-d}D_dMO_6$ (e.g., $AlZMO_6$ when d is 0, such as $AlHfTaO_6$). In another exemplary embodiment, when b is 0 and A is Y, the compound has the formula: $YZ_{1-d}D_dMO_6$ (e.g., $YZMO_6$ when d is 0, such as $YHfTaO_6$). In still another exemplary embodiment, when b is 0 and A is Er, the compound has the formula: $ErZ_{1-d}D_dMO_6$ (e.g., $ErZMO_6$ when d is 0, such as $ErHfTaO_6$).

The "A site" of the compound having Formula 1 includes, in one particular embodiment, aluminum (Al) in combination with another A element (e.g., Ga, In, Sc, Y, Ce, Pr, Nd, Pm, Sm, Eu, Gd, Tb, Dy, Ho, Er, Tm, Yb, Lu, Fe, Cr, Co, Mn, Bi, or a mixture thereof). Without wishing to be bound by any particular theory, it is believed that the presence of Al in the compound increases the hardness of the coating. In certain embodiments, Al is present in combination with another element at the "A site" and then the compound can be described as having the formula:

$$Al_xA_{1-x-b}B_bZ_{1-d}D_dMO_6 \quad \text{(Formula 2)}$$

where x is about 0.01 to about 0.99; A is Ga, In, Sc, Y, Ce, Pr, Nd, Pm, Sm, Eu, Gd, Tb, Dy, Ho, Er, Tm, Yb, Lu, Fe, Cr, Co, Mn, Bi, or a mixture thereof; b is 0 to about 0.5 (e.g., 0 to about 0.2, such as about 0.001 to about 0.5 or about 0.001 to about 0.2); Z is Hf, Ti, or a mixture thereof; D is Zr, Ce, Ge, Si, or a mixture thereof; d is 0 to about 0.5 (e.g., 0 to about 0.2, such as about 0.001 to about 0.5 or about 0.001 to about 0.2); and M is Ta, Nb, or a mixture thereof. In certain embodiments, x is about 0.05 to about 0.9, such as about 0.1 to about 0.75. In one particular embodiment, up to half of the element mixture at the A site of the compound of Formula 1 may be Al (e.g., x is about 0.1 to about 0.5 in the compound of Formula 2).

In addition to Al, the "A site" of the compound having Formula 1 includes, in one particular embodiment, a combination of Al and gallium (Ga), or a combination of Al and indium (In), with or without the presence of another A element (e.g., In, Sc, Y, Ce, Pr, Nd, Pm, Sm, Eu, Gd, Tb, Dy, Ho, Er, Tm, Yb, Lu, Fe, Cr, Co, Mn, Bi, or a mixture thereof). Without wishing to be bound by any particular theory, it is believed that the presence of Ga in the compound reduces the average ionic radius of at the A site, which adjusts the coefficient of thermal expansion (CTE) of the layer 110. Thus, the amount of Ga in the compound may be used to control the CTE of the layer 110 to adjust it to be as close to the CTE of the adjacent layers within the coating system 106 and/or the CTE of the substrate 102.

When the compound includes Al and Ga in a portion of the "A site," then the compound can be descried as having the formula:

$$Al_xGa_yA_{1-x-y-b}B_bZ_{1-d}D_dMO_6 \quad \text{(Formula 3.1)}$$

where x is about 0.01 to about 0.99 as described above with respect to Formula 2; y is about 0.01 to about 0.9; x+y is 1 or less; A is In, Sc, Y, Ce, Pr, Nd, Pm, Sm, Eu, Gd, Tb, Dy, Ho, Er, Tm, Yb, Lu, Fe, Cr, Co, Mn, Bi, or a mixture thereof; b is 0 to about 0.5 (e.g., 0 to about 0.2, such as about 0.001 to about 0.5 or about 0.001 to about 0.2); Z is Hf, Ti, or a mixture thereof; D is Zr, Ce, Ge, Si, or a mixture thereof; d is 0 to about 0.5 (e.g., 0 to about 0.2, such as about 0.001 to about 0.5 or about 0.001 to about 0.2); and M is Ta, Nb, or a mixture thereof. Another element may be present at the A site in the compound of Formula 3 when x+y is less than 1 (i.e., x+y>1). In one particular embodiment, up to half of the element mixture at the A site of the compound of Formula 1 may be Al (e.g., x is about 0.1 to about 0.5 in the compound of Formula 3.1) and up to half of the element mixture at the A site of the compound of Formula 1 may be Ga (e.g., y is about 0.1 to about 0.5 in the compound of Formula 3.1).

When the compound includes Al and Ga in a portion of the "A site," then the compound can be descried as having the formula:

$$Al_xIn_yA_{1-x-y-b}B_bZ_{1-d}D_dMO_6 \quad \text{(Formula 3.2)}$$

where x is about 0.01 to about 0.99 as described above with respect to Formula 2; y is about 0.01 to about 0.9; x+y is 1 or less; A is Ga, Sc, Y, Ce, Pr, Nd, Pm, Sm, Eu, Gd, Tb, Dy, Ho, Er, Tm, Yb, Lu, Fe, Cr, Co, Mn, Bi, or a mixture thereof; b is 0 to about 0.5 (e.g., 0 to about 0.2, such as about 0.001 to about 0.5 or about 0.001 to about 0.2); Z is Hf, Ti, or a mixture thereof; D is Zr, Ce, Ge, Si, or a mixture thereof; d is 0 to about 0.5 (e.g., 0 to about 0.2, such as about 0.001 to about 0.5 or about 0.001 to about 0.2); and M is Ta, Nb, or a mixture thereof. Another element may be present at the A site in the compound of Formula 3 when x+y is less than 1 (i.e., x+y>1). In one particular embodiment, up to half of the element mixture at the A site of the compound of Formula 1 may be Al (e.g., x is about 0.1 to about 0.5 in the compound of Formula 3.2) and up to half of the element mixture at the A site of the compound of Formula 1 may be In (e.g., y is about 0.1 to about 0.5 in the compound of Formula 3.2).

In particular embodiments, erbium (Er), yttrium (Y), samarium (Sm), and/or holmium (Ho) may be included within the A site of the compounds having the Formula 1, Formula 2, and/or Formula 3.1 and/or Formula 3.2 (i.e., A includes Er, Y, Sm, Ho, or a mixture thereof in any of Formulas 1, 2, 3.1 or 3.2). Without wishing to be bound by any particular theory, it is believed that the Er, Y, Sm, and/or Ho may provide CMAS resistance to the layer 110 formed from such a compound.

Referring to Formulas 1, 2, 3.1, and 3.2, where b is greater than 0, boron (B) dopes the "A site" of the compound of Formula 1 to change the CTE and/or the sintering temperature of the layer formed from the compound. Additionally, B may migrate to other layers (e.g., the bond coating and/or thermally growth oxide layer) to help those layers interact with CMAS and/or to control the crystallization of those layers. However, in other embodiments, b is 0 such that no B is present in the compound.

The "Z site" of any of the compounds having Formula 1, 2, 3.1 or 3.2 may be utilized, in one particular embodiment, to help control the CTE of the compound. Generally, the CTE of the compound is directly proportional to the ionic radius of at Z site. For example, the CTE of the compound decreases as the ionic radius of the Z site element decreases. In particular embodiments, the Z site may include Hf, Ti, or a mixture thereof, such as represented in Formula 4:

$$A_{1-b}B_bHf_hTi_tD_{1-h-t}MO_6 \quad \text{(Formula 4)}$$

where h is 0 to 1, t is 0 to 1, and h+t is greater than 0 to 1; A is Al, Ga, In, Sc, Y, Ce, Pr, Nd, Pm, Sm, Eu, Gd, Tb, Dy, Ho, Er, Tm, Yb, Lu, Fe, Cr, Co, Mn, Bi, or a mixture thereof; b is 0 to about 0.5 (e.g., 0 to about 0.2, such as about 0.001 to about 0.5 or about 0.001 to about 0.2); D is Zr, Ce, Ge, Si, or a mixture thereof; and M is Ta, Nb, or a mixture thereof. In one particular embodiment of Formula 4, the A site may include Al (e.g., as discussed above with respect to Formula 2), Ga (e.g., as discussed above with respect to Formula 3), In, and/or other materials, and/or B (e.g., as discussed above with respect to Formulas 1, 2, or 3). In certain embodiments, h+t may be greater than 0 but less than 1, such that another element (D) is present at the Z site.

In one embodiment, Hf is present in the compound such that h is greater than 0 to 1 (e.g., about 0.05 to about 1). In one particular embodiment when both Hf and Ti are present in the compound (i.e., both h and t are greater than 0), Hf may be present in a molar amount that is greater than the amount of Ti, such that h is greater than t. In one embodiment, Hf may be the majority of the element in terms of molar ration (i.e., h is 0.5 to 1) at the Z site. For example, h may be 1 in particular embodiments, such that t is 0 and 1−t is 0 (i.e., Hf is the sole element at the Z site). Without wishing to be bound by any particular theory, it is believed that Hf in the Z site may increase hardness and the steam resistance of the coating formed from such a compound.

In particular embodiments, where Hf is present in the "Z site" (i.e., Z includes Hf either alone or in combination with Ti and/or D), a combination of elements may be included in the "A site." For example, such a compound may have the formula:

$$A_xB_bLn_{1-x-b}Hf_{1-t-d}Ti_tD_dMO_6 \quad \text{(Formula 5)}$$

where: A is Al, Ga, In, Sc, Y, Ce, Pr, Nd, Pm, Sm, Eu, Gd, Tb, Dy, Ho, Er, Tm, Yb, Lu, Fe, Cr, Co, Mn, Bi, or a mixture thereof; x is about 0.01 to about 0.99; b is 0 to about 0.5 with 1−x−b being 0 to about 0.99 such that Ln is present in the compound; Ln is Sc, Y, La, Ce, Pr, Nd, Pm, Sm, Eu, Gd, Tb, Dy, Ho, Er, Tm, ytterbium Yb, Lu, or a mixture thereof, and with Ln being different than A in terms of composition; t is 0 to about 0.99; D is Zr, Ce, Ge, Si, or a mixture thereof; d is 0 to about 0.5; the sum of t and d is less than 1 such that Hf is present in the compound; and M is Ta, Nb, or a mixture thereof.

When A includes Al in combination with another element, Formula 5 can be modified as follows:

$$Al_xA'_aB_bLn_{1-x-a-b}Hf_{1-t-d}Ti_tD_dMO_6 \quad \text{(Formula 6)}$$

where: x is about 0.01 to about 0.99 such that Al is present in the compound; A' is Ga, In, Sc, Y, Ce, Pr, Nd, Pm, Sm, Eu, Gd, Tb, Dy, Ho, Er, Tm, Yb, Lu, Fe, Cr, Co, Mn, Bi, or a mixture thereof; a is 0 to about 0.99; b is 0 to about 0.5, with 1−x−a−b being 0 to about 0.99 such that Ln is present in the compound; Ln is Sc, Y, La, Ce, Pr, Nd, Pm, Sm, Eu, Gd, Tb, Dy, Ho, Er, Tm, ytterbium Yb, Lu, or a mixture thereof, and wherein Ln is different than A in terms of composition; t is 0 to about 0.99; D is Zr, Ce, Ge, Si, or a mixture thereof; d is 0 to about 0.5; the sum of t and d is less than 1 such that Hf is present in the compound; and M is Ta, Nb, or a mixture thereof.

For example, both Al and Ga may be present at the A site in combination with another element (with Hf included in the Z site), such as in the formula:

$$Al_xGa_yB_bLn_{1-x-y-b}Hf_{1-t-d}Ti_tD_dMO_6 \quad \text{(Formula 7)}$$

where: x is about 0.01 to about 0.99 such that Al is present in the compound; y is about 0.01 to about 0.99 such that Ga is present in the compound; b is 0 to about 0.5, with 1−x−a−b being 0 to about 0.99 such that Ln is present in the compound; Ln is Sc, Y, La, Ce, Pr, Nd, Pm, Sm, Eu, Gd, Tb, Dy, Ho, Er, Tm, ytterbium Yb, Lu, or a mixture thereof, and wherein Ln is different than A in terms of composition; t is 0 to about 0.99; D is Zr, Ce, Ge, Si, or a mixture thereof; d is 0 to about 0.5; the sum of t and d is less than 1 such that Hf is present in the compound; and M is Ta, Nb, or a mixture thereof.

The material of the "M site" of the compound of any of Formulas 1-7 may influence the phase allowance and CTE of the resulting compound. In one particular embodiment, the M site may be Nb without any additional element present, which may provide better phase allowance and CTE matching when utilized as a layer within an EBC coating.

Particularly suitable compounds for use as a relatively thick or thin EBC layer may have a particularly close coefficient of thermal expansion (CTE) to the underlying CMC substrate. For example, aluminum containing hafnium tantalates may be particularly suitable compounds having CTEs relatively close to that of the CMC substrate. For example, aluminum containing hafnium tantalates may have the formula:

$$Al_{1-x-y}A'_xA''_yHfTaO_6 \quad \text{(Formula 8)}$$

where A' is Er, Sm, or a mixture thereof; x is about 0.3 to about 0.45; A" is In, Ga, or a mixture thereof; y is about 0.15 to about 0.35; and (x+y) is about 0.5 to about 0.7 such that Al is present from about 0.3 to about 0.5. In particular embodiments, A' is either Er or Sm, and/or A" is either In or Ga. The compound of Formula 8 may also be referring to from Formula 1 where (referring to Formula 1) A includes Al in combination with two other elements (A' and A" of Formula 8); b is 0, Z is Hf, d is 0, and M is Ta.

Particularly suitable compounds for use as a relatively thin EBC layer (e.g. having a thickness of about 100 μm or less) may have a coefficient of thermal expansion (CTE) that is close to the CTE of the underlying CMC substrate but not within a CTE matching relations. For example, erbium containing hafnium tantalates may be particularly suitable compounds for such EBC layers, and may have the formula:

$$Al_{1-x-y}Er_xGa_yHfTaO_6 \quad \text{(Formula 9)}$$

where x is about 0.4 to about 0.6; y is 0 to about 0.4; and (x+y) is about 0.5 to about 0.85 such that Al is present from about 0.15 to about 0.5. The compound of Formula 9 may also be referring to from Formula 1 where (referring to Formula 1) A includes a combination of Er, Al, and Ga; b is 0, Z is Hf, d is 0, and M is Ta. As another example having a close CTE match to to a CMC substrate of SiC, scandium containing hafnium tantalates may be particularly suitable compounds for such EBC layers, and may have the formula:

$$Al_xSc_{1-x}HfTaO_6 \quad \text{(Formula 10)}$$

where x is 0.01 to 0.1 such that Al is present from 0.01 to 0.1 and Sc is present from 0.9 to 0.99. The compound of Formula 10 may also be referring to from Formula 1 where (referring to Formula 1) A includes a combination of Al and Sc; b is 0; Z is Hf; d is 0; and M is Ta. Additionally, compound of Formula 10 may also be referring to from Formula 2 where (referring to Formula 2) x is 0.01 to 0.1; A is Sc; b is 0; Z is Hf; d is 0; and M is Ta. Such a compound is not only a very close CTE match to a CMC substrate of SiC, but also is non-reactive with other EBC layers like rare earth silicates/disilicates, mullite, BSAS, silicon, etc.

As stated, the compound of any of Formulas 1-9 may be included in a layer of an EBC 108 of the coating system 106 so as to provide a material having minimal reaction with CMAS and has high hardness (e.g., for erosion resistance) after reaction with CMAS. Thus, the material of the compounds of any of Formulas 1-9 may be included within a layer of the EBC with other materials of an EBC layer, or may be used to form a separate layer within the EBC 108. In one embodiment, a layer of the EBC 108 is formed from the compound of any of Formulas 1-9, and may have a thickness of about 1 μm to about 1 mm (e.g., 1 μm to about 100 μm).

In one particular embodiment, the balance of CMAS resistance and low thermal expansion mismatch may be particularly achieved when the average ionic radius of the "A-site" dopants is about 71.2 pm (picometers) to about 75.2 pm. For example, such a compound may be achieved by using a mixture of rare earth, Al and Ga or a mixture of rare earth, Al, and In; the Z site is 100% Hf, and the M site is 100% Ta. Without wishing to be bound by any particular theory, it is believed that such a compound may lead to a coating having a majority phase of Pbcn, but may also have more than one phase.

In one embodiment, the slurry also includes a sintering aid that facilitates the densification of the slurry applied layer. For example, the sintering aid may lower the temperature required to densify the layer, such as to about 1600° C. or less (e.g., about 1300° C. to about 1600° C.), about 1500° C. or less (e.g., about 1300° C. to about 1600° C.), or about 1450° C. or less (e.g., about 1300° C. to about 1450° C.).

For example, sintering aids that may be included within the slurry in combination with the rare earth compound include, but are not limited to silicon, Si, or silicon containing compounds (e.g. including but not limited to $SiO_2$, Si-containing organic compounds, preceramic polymers, or resins), aluminum, Al, or aluminum containing compounds (e.g. including but not limited to $Al_2O_3$, AlN, aluminum acetate, aluminum nitrate, aluminum carbonate, aluminum containing organometallic compounds), boron, B, or boron containing compounds (e.g., including but not limited to $B_4C$, $B_2O_3$, boric acid, B-containing organic compounds), lithium containing compounds (e.g. including but not limited to $Li_2O$, $LiCO_3$, lithium-based glass), copper, Cu, or copper containing compounds (e.g. including but not limited to CuO, $Cu_2O$, copper acetate, copper nitrate, copper carbonate, copper containing organometallic compounds), zinc, Zn, or zinc containing compounds (e.g., including but not limited to ZnO, zinc acetate, zinc nitrate, zinc carbonate, zinc containing organometallic compounds), iron, Fe, or iron containing compounds (e.g., including but not limited to $Fe_2O_3$, $Fe_3O_4$, $FeSi_2$, FeSi, iron acetate, iron nitrate, iron carbonate, iron containing organometallic compounds), titanium, Ti, or titanium containing compounds (e.g. including but not limited to $TiO_2$, TiN, and titanates), gallium, Ga, or gallium containing compounds (e.g. including but not limited to $Ga_2O_3$, gallates), nickel, Ni, or nickel containing compounds (e.g., including but not limited to NiO, nickel acetate, nickel nitrate, nickel carbonate, nickel containing organometallic compounds), magnesium containing compounds (e.g., including but not limited to MgO, magnesium acetate, magnesium nitrate, magnesium carbonate, magnesium containing organometallic compounds), cobalt, Co, or cobalt containing compounds (e.g., including but not limited to $Co_3O_4$, cobalt acetate, cobalt nitrate, cobalt carbonate, cobalt containing organometallic compounds), or mixtures thereof.

Preferred embodiments contain at least one sintering aid that does not form binary compounds with silicon oxide including copper, gallium, iron, and titanium oxides. This ensures minimal reaction if there is a silicon bond coat in the EBC system.

The weight ratio of sintering aid to the rare earth compound ranges from 0.0001 to 0.1. In another embodiment, the preferred weight ratio of sintering aid to rare earth compound ranges from 0.008 to 0.028.

In one embodiment, the sintering aid may be present in a concentration that results in a sintered layer having a phase that is leave only the same phase(s) present as if no sintering aid were used. That is, the sintering aid dissolves into the rare earth compound during sintering and is undetectable in the sintered coating as a separate phase. Alternatively, the sintering aid may be present in an excess concentration that results in a sintered layer having minor amount of a new, sintering-aid rich phase as a separate phase from the rare earth compound phase, without inhibiting the performance of the sintered coating in terms of steam or CMAS resistance. That is, a majority of the sintering aid dissolves into the material while an excess portion of the sintering aid dissolves into the rare earth compound to form a discrete phase within the sintered layer that is "sintering-aid rich" in that there is an excess of the sintering-aid that is not dissolved within the rare earth compound. For example, a majority (in terms of weight amount) of the sintering aid dissolves into the rare earth compound to form a continuous phase within the sintered layer while an excess portion of the sintering aid dissolves into the rare earth compound to form a discrete sintering aid-rich phase dispersed within the continuous phase.

As stated above, additional components may also be included within the slurry, including organic processing aids. As used herein, "organic processing aids" refers to any dispersants, surfactants, plasticizers, additives for controlled dispersion, thickeners, and/or binders present in the slurry. These organic processing aids are comprised primarily of carbon and other elements that volatilize during processing such that they are not present in the post-sintered coating.

As used herein, "dispersant" refers to compositions selected from the group consisting of polyacrylic acid, polyacrylic acid-polyethylene oxide copolymers, polymethacrylic acid, polyethylenimine, polyvinyl pyrrolidone, ammonium polyacrylate, ammonium polymethacrylate, sulfonated naphthalene formaldehyde condensate, polyvinyl sulfonic acid, and mixtures thereof.

As used herein, "plasticizer" refers to compositions selected from the group consisting of ethylene glycol, diethylene glycol, triethylene glycol, tetraethylene glycol glycerol, glycerin, glycerol, polyethylene glycol, diethylene glycol monobutyl ether, dibutyl phthalate, di(propylene glycol) dibenzoate, and mixtures thereof.

As used herein, "surfactant" refers to compositions selected from the group consisting of fluorocarbons, dimethyl silicones, acetylenic glycol chemistries (e.g. commercial surfactants in the Surfynol® series (Air Products and Chemicals, Inc.)), and mixtures thereof. Surfactants are often used to reduce or eliminate foam in a slurry.

As used herein, "additive for controlled dispersion" refers to compositions selected from the group consisting of citric acid, glycine, dextrose, sucrose, mannose, tartaric acid, oxalic acid, and mixtures thereof.

As used herein, "binder" refers to compositions that provide strength to a slurry-deposited layer during and after drying or solvent removal. The binder may be a soluble binder or a latex binder. The term "soluble binder" refers to binder compositions that dissolve in the slurry solvent. These binders may include but are not limited to polyvinyl pyrrolidone, polyvinyl butyral, various varieties of cellulose (e.g. ethyl cellulose, methyl cellulose, etc.), xantham gum, and polyethylene oxide. Soluble binders may also have the effect of increasing the viscosity of the slurry. The term "latex binder" refers to binder compositions that are suspensions (i.e., solids particles dispersed in liquid medium) or emulsions (i.e. liquid droplets that are immiscible yet dispersed in liquid medium). Latex binder compositions are selected from the group consisting of polystyrene, polyvinyl alcohol, polyvinyl butyrol, styrene-butadiene copolymer, polyacrylic acid, polyacrylates, acrylic polymers, polymethyl methacrylate/polybutyl acrylate, polyvinyl acetate, polyvinyl malate, natural latex rubber, and mixtures thereof. Some examples of latex binders can include Rhoplex® HA-8, Rhoplex® HA-12, Pavecryl® 2500 (Rohm and Haas). These binder types, when the chemistry is chosen properly, do not increase the slurry viscosity quite as rapidly with addition as soluble binders.

In one embodiment, the slurry can be formed by combining the solvent (e.g., water and/or an organic solvent), plasticizer, dispersant, sintering aid, primary material, and optionally, additives for controlled dispersion, along with any necessary mixing media in a container and mix for about 3 hours to about 15 hours.

The mixture can be mixed using conventional techniques known to those skilled in the art such as shaking with up to about a 1 mm to 6.35 mm diameter alumina or zirconia mixing media, ball milling using about a diameter of about 6.35 mm to about 25.4 mm alumina or zirconia mixing media, attritor milling using about a 1 mm to about a 5 mm diameter zirconia-based mixing media, planetary ball milling using from about a 1 mm to about a 5 mm diameter zirconia-based media, or mechanical mixing or stirring with simultaneous application of ultrasonic energy. The mixing media or ultrasonic energy can break apart any agglomerated ceramic particles in the slurry. Any mixing media present may subsequently be removed by straining, for example. Binder can then be added and mixed with mild to rigorous agitation depending on the balance to achieve homogeneity quickly (by dissolving soluble binder or dispersing latex binder) versus the prevention of foam or air entrainment into the slurry. Optionally, surfactants can be used to defoam the slurry if the mixing is too rigorous and a large amount of foam is generated; however, this is more the case in aqueous suspensions than solvent-based. Once the slurry is homogenous, it is ready for use.

Those skilled in the art will understand that the previous embodiment is one method for making the slurry compositions described herein, and that other methods are also acceptable.

If desired, masking can be applied to the ceramic component before the slurry is applied to prevent coating specific areas of the component. Masking may be accomplished using conventional techniques known to those skilled in the art including, but not limited to, tapes, tooling, and paint-on adhesives.

Once all desired masking of the ceramic component is complete, the slurry can be applied to produce a coated component. The slurry can be applied directly to the ceramic component using any conventional slurry deposition method known to those skilled in the art, including but not limited to, dipping the component into a slurry bath, or painting, rolling, stamping, spraying, or pouring the slurry onto the component. In one embodiment, slurry application can be carried out in a humid environment to help prevent water evaporation that could change the slurry rheology, for example, during coating deposition onto a large batch of parts. In one embodiment, the environment can comprise greater than 50% relative humidity, in another embodiment greater than 70% relative humidity, and in yet another embodiment greater than 95% relative humidity, all at or near room temperature (about 20° C. to about 30° C.). Slurry application can be carried out manually or it may be automated.

Once the slurry has been applied to the ceramic component, and while the slurry is still wet, it may be leveled to remove excess slurry material. Leveling may be carried out using conventional techniques such as, but not limited to, spinning, rotating, slinging the component, dripping with or without applied vibration, or using a doctor blade, to remove excess slurry material. Similar to slurry application, leveling can be conducted manually or it may be automated, and it can be carried out in a humid environment because if the slurry dries too quickly, it can lead to defects in the coating during leveling.

Next, the coated component can be dried. Drying may be carried out in ambient or controlled temperature and humidity conditions. In one embodiment, controlled temperature and humidity can be utilized to help maintain the integrity of the applied slurry coating. More particularly, in one embodiment, drying may be carried out at temperatures of from about 5° C. to about 100° C., and in another embodiment, from about 20° C. to about 30° C., and in an environment comprising from about 10% relative humidity to about 95% relative humidity, in one embodiment from about 50% relative humidity to about 90% relative humidity, and in yet another embodiment from about 70% relative humidity to about 80% relative humidity. In yet another embodiment, drying can be accelerated using a vacuum or partial vacuum.

After drying, any masking present may be removed by peeling off tapes and adhesives, pyrolysis of tapes and adhesives, or by removing multi-use tooling. Any rough edges remaining after masking removal may be scraped or cut away using conventional means.

Next, burnout of the organic processing aids may be carried out by placing the dried component in an elevated temperature environment so that any residual water or solvent can be evaporated and the organic processing aids can be pyrolyzed. In one embodiment, burnout of the organic processing aids may be accomplished by heating the dried component at a rate of from about 1° C./min to about 15° C./min to a temperature of from about 400° C. to about 1000° C. and holding the component at this temperature for from about 0 to about 2 hours. In another embodiment, the coated component may be heated at a rate of from about 2° C./min to about 6° C./min to a temperature of from about 600° C. to about 800° C. and holding the component at this temperature for from about 0 to about 2 hours. In another embodiment, the hold time can be eliminated by slowly ramping up to the target temperature without holding, followed by ramping up or down to another temperature at a different rate. In another embodiment, binder burnout can occur rapidly by placing the coated component into a furnace heated to a temperature of from about 400° C. to about 1400° C.

The dried component may then be sintered to produce a component comprising an environmental barrier coating. Sintering can serve to simultaneously densify and impart strength to the coating. Additionally, sintering can impart a hermetic seal against high temperature steam present in the engine environment. Sintering can be carried out using a conventional furnace, or by using such methods as microwave sintering, laser sintering, infrared sintering, and the like. In one embodiment, the coating layer has a porosity of 20% to 40% porosity by volume after its application (prior to sintering). When a sintering agent is present in the slurry (and thus the formed coating), the sintering treatment may be performed to densify the coating to greater than 85% theoretical density.

Sintering can be accomplished by heating the dried component at a rate of from about 1° C./min to about 15° C./min to a temperature of from about 1100° C. to about 1700° C. and holding the component at that temperature for from about 0 to about 24 hours. In another embodiment, sintering can be accomplished by heating the coated component at a rate of from about 5° C./min to about 15° C./min to a sintering temperature, such as described above, and holding the component at that temperature for from about 0 to about 24 hours. In one particular embodiment, the sintering temperature may be about 1300° C. to about 1375° C.

Alternately, in another embodiment, binder burnout and sintering can be carried out in a single process by heating at a rate of about 1° C./minute to about 15° C./minute to a temperature of from about 400° C. to about 1000° C. and holding at this temperature for from about 0 to about 2 hours. The component can then be heated at a rate of from about 1° C./minute to about 15° C./minute from the binder burnout temperature to from about 1100° C. to about 1700° C. and holding at his temperature for from about 0 to about 24 hours, as set forth in the Examples below.

In an alternate embodiment, all layers of the EBC can be applied, one on top of the other, before masking removal, organic processing aid burnout, and sintering are carried out. Those skilled in the art will understand that after application of each layer, the layer should be at least partially dried before application of the subsequent layer.

In another embodiment, the sintering aid does not need to be added directly to every layer of the slurry to achieve the desired result. For example, the first slurry layer can comprise the sintering aid while the next layer slurry does not. In this instance, during sintering the sintering aid can diffuse from one layer to the next. In another embodiment, a slurry with no sintering aid can be densified by applying the layer, allowing it to dry, and then back infiltrating a sol-gel solution comprised of a water soluble or solvent soluble sintering aid prior to heat treatment.

In one embodiment, the slurry deposition process may be used to form a layer that includes the compound of any of Formulas 1-9 as one of the layers of the EBC 108 (e.g., the outermost layer of the EBC 108) of the coating system 106, such that the compound may help protect any underlying EBC layers, the underlying bond coating, and the substrate 102. The substrate 102 may be formed from a ceramic matrix composite ("CMC") material, such as a silicon based, non-oxide ceramic matrix composite. As used herein, "CMC" refers to a silicon-containing, or oxide-oxide, matrix and reinforcing material. As used herein, "monolithic ceramics" refers to materials without fiber reinforcement (e.g., having the matrix material only). Herein, CMCs and monolithic ceramics are collectively referred to as "ceramics."

Some examples of CMCs acceptable for use herein can include, but are not limited to, materials having a matrix and reinforcing fibers comprising non-oxide silicon-based materials such as silicon carbide, silicon nitride, silicon oxycarbides, silicon oxynitrides, and mixtures thereof. Examples include, but are not limited to, CMCs with silicon carbide matrix and silicon carbide fiber; silicon nitride matrix and silicon carbide fiber; and silicon carbide/silicon nitride matrix mixture and silicon carbide fiber. Furthermore, CMCs can have a matrix and reinforcing fibers comprised of oxide ceramics. Specifically, the oxide-oxide CMCs may be comprised of a matrix and reinforcing fibers comprising oxide-based materials such as aluminum oxide ($Al_2O_3$), silicon dioxide ($SiO_2$), aluminosilicates, and mixtures thereof. Aluminosilicates can include crystalline materials such as mullite ($3Al_2O_3 2SiO_2$), as well as glassy aluminosilicates.

As shown, the bond coating 104 is optionally positioned on the surface 103 of the substrate 102 between the substrate 102 and the EBC 108. When present, the bond coating 104 includes silicon or a silicon based material (e.g., a silicide, etc.). Generally, the bond coating 104 is relatively thin, such as having a thickness that is about 25 micrometers (m) to about 275 μm, such as about 25 μm to about 150 μm (e.g., about 25 μm to about 100).

Figure 2:
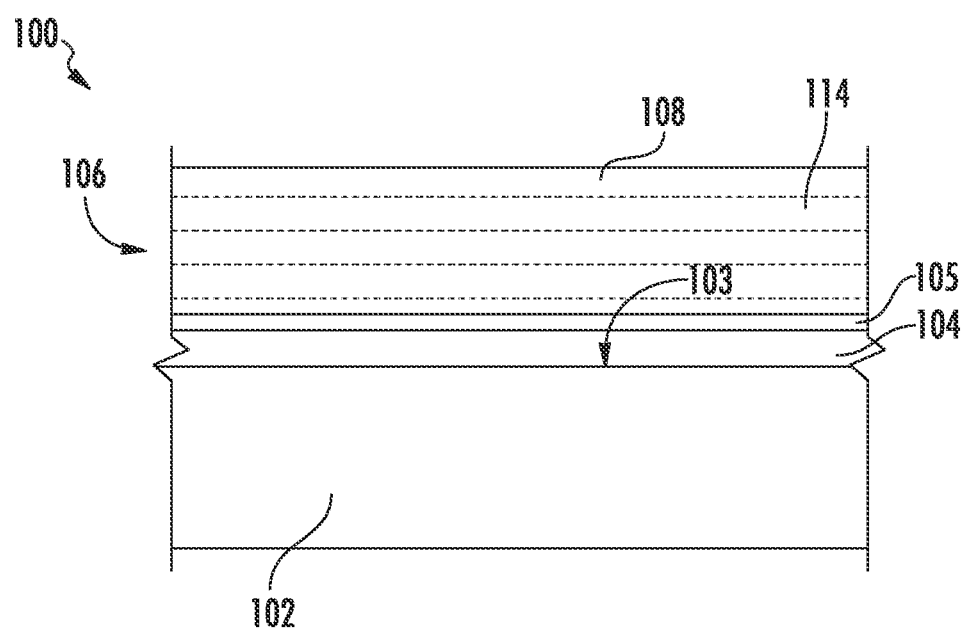
FIG. 2 shows an exemplary coated component having a substrate with a coating system thereon.

FIG. 2 shows a thermally grown oxide ("TGO") layer 105, which may form on the surface of the silicon-based bond coating 104, such as a layer of silicon oxide (sometimes referred to as "silicon oxide scale" or "silica scale"), during exposure to oxygen (e.g., during manufacturing and/or use) of the component 100.

The coated component 100 of FIG. 1 is particularly suitable for use as a component found in high temperature environments, such as those present in gas turbine engines, for example, combustor components, turbine blades, shrouds, nozzles, heat shields, and vanes. In particular, the turbine component can be a CMC component positioned within a hot gas flow path of the gas turbine such that the coating system 106 forms an environmental barrier for the underlying substrate 102 to protect the component 100 within the gas turbine when exposed to the hot gas flow path.

Figure 3:
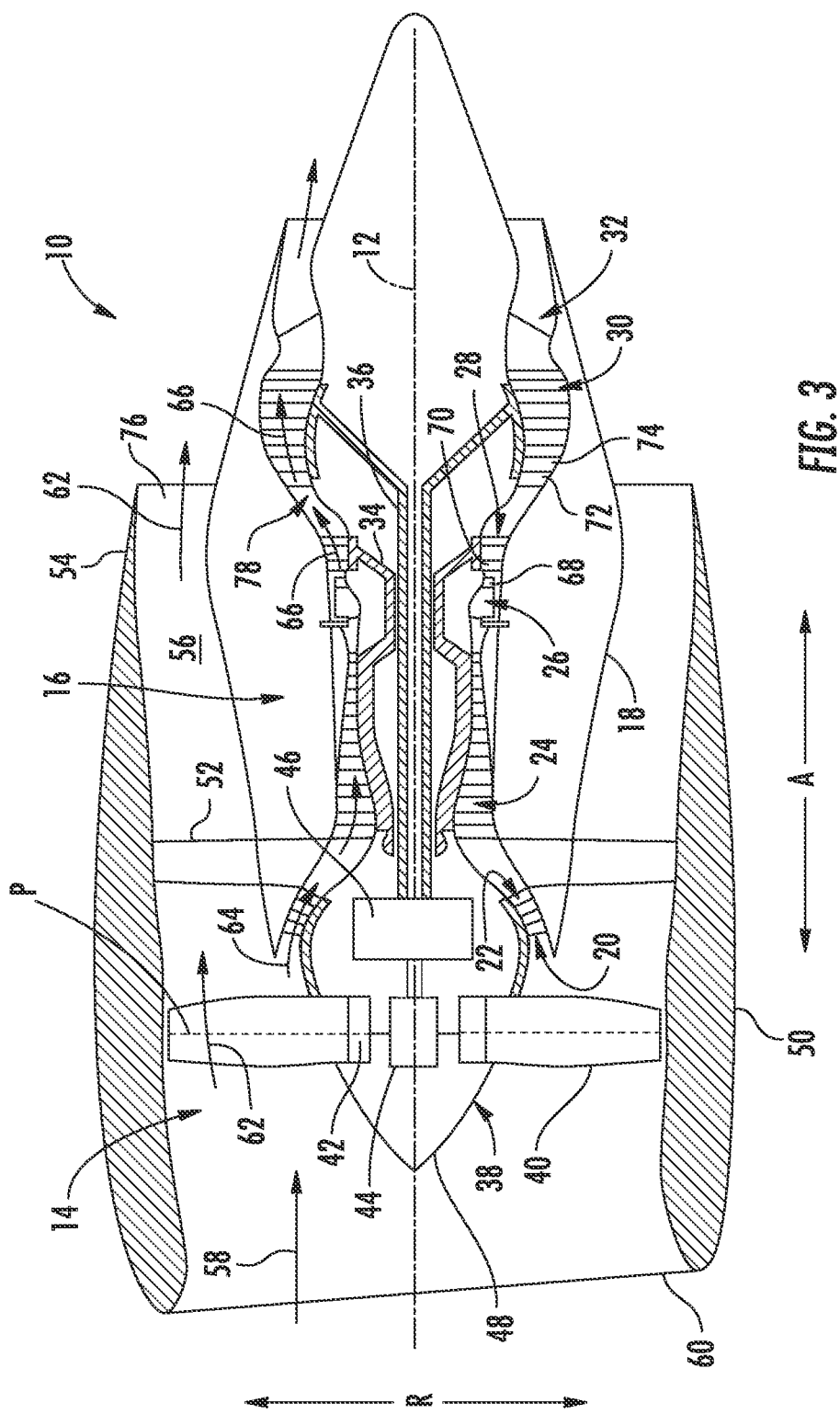
FIG. 3 is a schematic cross-sectional view of a gas turbine engine which may include the coated component of FIG. 1 therein.

FIG. 3 is a schematic cross-sectional view of a gas turbine engine in accordance with an exemplary embodiment of the present disclosure. More particularly, for the embodiment of FIG. 3, the gas turbine engine is a high-bypass turbofan jet engine 10, referred to herein as "turbofan engine 10." As shown in FIG. 3, the turbofan engine 10 defines an axial direction A (extending parallel to a longitudinal centerline 12 provided for reference) and a radial direction R. In general, the turbofan 10 includes a fan section 14 and a core turbine engine 16 disposed downstream from the fan section 14. Although described below with reference to a turbofan engine 10, the present disclosure is applicable to turbomachinery in general, including turbojet, turboprop and turboshaft gas turbine engines, including industrial and marine gas turbine engines and auxiliary power units.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the embodiment depicted, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal axis 12 by LP shaft 36 across an optional power gear box 46. The power gear box 46 includes a plurality of gears for stepping down the rotational speed of the LP shaft 36 to a more efficient rotational fan speed.

Referring still to the exemplary embodiment of FIG. 3, the disk 42 is covered by rotatable front nacelle 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that the nacelle 50 may be configured to be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass airflow passage 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

Further aspects of the invention are provided by the subject matter of the following clauses:

1. A method of forming a coating on a surface of a substrate, the method comprising: applying a slurry onto the surface of the substrate to form a coating, wherein the slurry comprises a rare earth compound dispersed within a solvent, wherein the rare earth compound has the formula: $A_{1-b}B_bZ_{1-d}D_dMO_6$ where A is Al, Ga, In, Sc, Y, Ce, Pr, Nd, Pm, Sm, Eu, Gd, Tb, Dy, Ho, Er, Tm, Yb, Lu, Fe, Cr, Co, Mn, Bi, or a mixture thereof; b is 0 to about 0.5; Z is Hf, Ti, or a mixture thereof; D is Zr, Ce, Ge, Si, Ru, or a mixture thereof; d is 0 to about 0.5; and M is Ta, Nb, or a mixture thereof; and densifying the coating at a sintering temperature.

2. The method of any preceding clause, wherein the sintering temperature is about 1300° C. to about 1600° C.

3. The method of any preceding clause, wherein the sintering temperature is about 1300° C. to about 1450° C.

4. The method of any preceding clause, wherein the slurry further comprises a sintering aid.

5. The method of any preceding clause, further comprising: prior to applying the slurry, forming a bond coating on the surface of the substrate such that the slurry is applied over the bond coating.

6. The method of any preceding clause, wherein the substrate is a ceramic matrix composite.

7. The method of any preceding clause, wherein the substrate is a ceramic matrix composite comprising silicon carbide fibers within a silicon carbide matrix.

8. The method of any preceding clause, wherein the coating has a thickness of about 1 μm to about 1 mm.

9. The method of any preceding clause, wherein the coating is an external layer of the coating system.

10. The method of any preceding clause, wherein b is 0, and wherein A consists of an element selected from the group consisting of Al, Ga, In, Sc, Y, Ce, Pr, Nd, Pm, Sm, Eu, Gd, Tb, Dy, Ho, Er, Tm, Yb, Lu, Fe, Cr, Co, Mn, Bi, and a mixture thereof.

11. The method of any preceding clause, wherein b is 0, and wherein A consists of an element selected from the group consisting of Al, Er, Sc, Sm, In, Ga, Ho, Y, and a mixture thereof.

12. The method of any preceding clause, wherein b is greater than 0 to about 0.5, wherein d is 0, wherein Z includes Hf, and wherein M includes Ta.

13. The method of any preceding clause, wherein A includes Al in combination with another element and wherein Z includes Hf such that the compound has the formula: $Al_xA'_aB_bLn_{1-x-a-b}Hf_{1-t-d}Ti_tD_dMO_6$ where: x is about 0.01 to about 0.99 such that Al is present in the compound; A' is Ga, In, Sc, Y, Ce, Pr, Nd, Pm, Sm, Eu, Gd, Tb, Dy, Ho, Er, Tm, Yb, Lu, Fe, Cr, Co, Mn, Bi, or a mixture thereof; a is 0 to about 0.99; b is 0 to about 0.5, with 1−x−a−b being 0 to about 0.99 such that Ln is present in the compound; Ln is Sc, Y, La, Ce, Pr, Nd, Pm, Sm, Eu, Gd, Tb, Dy, Ho, Er, Tm, ytterbium Yb, Lu, or a mixture thereof, and wherein Ln is different than A in terms of composition; t is 0 to about 0.99; D is Zr, Ce, Ge, Si, or a mixture thereof; d is 0 to about 0.5; the sum of t and d is less than 1 such that Hf is present in the compound; and M is Ta, Nb, or a mixture thereof.

14. The method of any preceding clause, where b is 0, and where t is 0.

15. The method of any preceding clause, where d is 0, and where M is Ta.

16. The method of any preceding clause, wherein A includes Al and Ga in combination with another element and wherein Z includes Hf such that the compound has the formula: $Al_xGa_yB_bLn_{1-x-y-b}Hf_{1-t-d}Ti_tD_dMO_6$ where: x is about 0.01 to about 0.99 such that Al is present in the compound; y is about 0.01 to about 0.99 such that Ga is present in the compound; b is 0 to about 0.5, with 1−x−a−b being 0 to about 0.99 such that Ln is present in the compound; Ln is Sc, Y, La, Ce, Pr, Nd, Pm, Sm, Eu, Gd, Tb, Dy, Ho, Er, Tm, ytterbium Yb, Lu, or a mixture thereof, and wherein Ln is different than A in terms of composition; t is 0 to about 0.99; D is Zr, Ce, Ge, Si, or a mixture thereof; d is 0 to about 0.5; the sum of t and d is less than 1 such that Hf is present in the compound; and M is Ta, Nb, or a mixture thereof.

17. The method of any preceding clause, wherein the rare earth compound has the formula: $Al_{1-x-y}A'_xA''_yHfTaO_6$ where A' is Er, Sm, or a mixture thereof; x is about 0.3 to about 0.45; A'' is In, Ga, or a mixture thereof; y is about 0.15 to about 0.35; and (x+y) is about 0.5 to about 0.7 such that Al is present from about 0.3 to about 0.5.

18. The method of any preceding clause, wherein the rare earth compound has the formula: $Al_{1-x-y}Er_xGa_yHfTaO_6$ where x is about 0.4 to about 0.6; y is 0 to about 0.4; and (x+y) is about 0.5 to about 0.85 such that Al is present from about 0.15 to about 0.5.

19. The method of any preceding clause, wherein the rare earth compound has the formula: $Al_xSc_{1-x}HfTaO_6$ where x is 0.01 to 0.1 such that Al is present from 0.01 to 0.1 and Sc is present from 0.9 to 0.99.

20. A sintered coating on a surface of a substrate formed according to the method of any preceding clause.

21. A sintered coating on a surface of a substrate, the sintered coating comprising a rare earth compound and a sintering aid, wherein the rare earth compound has the formula: $A_{1-b}B_bZ_{1-d}D_dMO_6$ where A is Al, Ga, In, Sc, Y, Ce, Pr, Nd, Pm, Sm, Eu, Gd, Tb, Dy, Ho, Er, Tm, Yb, Lu, Fe, Cr, Co, Mn, Bi, or a mixture thereof; b is 0 to about 0.5; Z is Hf, Ti, or a mixture thereof; D is Zr, Ce, Ge, Si, Ru, or a mixture thereof; d is 0 to about 0.5; and M is Ta, Nb, or a mixture thereof; and wherein the sintering aid dissolves into the rare earth compound during sintering such that the sintering aid is undetectable in the sintered coating as a separate phase.

22. A sintered coating on a surface of a substrate, the sintered coating comprising a rare earth compound and a sintering aid, wherein the rare earth compound has the formula: $A_{1-b}B_bZ_{1-d}D_dMO_6$ where A is Al, Ga, In, Sc, Y, Ce, Pr, Nd, Pm, Sm, Eu, Gd, Tb, Dy, Ho, Er, Tm, Yb, Lu, Fe, Cr, Co, Mn, Bi, or a mixture thereof; b is 0 to about 0.5; Z is Hf, Ti, or a mixture thereof; D is Zr, Ce, Ge, Si, Ru, or a mixture thereof; d is 0 to about 0.5; and M is Ta, Nb, or a mixture thereof; and wherein a majority of the sintering aid dissolves into the rare earth compound to form a continuous phase while an excess portion of the sintering aid dissolves into the rare earth compound to form a discrete sintering aid-rich phase dispersed within the continuous phase.

This written description uses exemplary embodiments to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of forming a coating on a surface of a substrate, the method comprising:
   applying a slurry onto the surface of the substrate to form a coating, wherein the slurry comprises a rare earth compound dispersed within a solvent, wherein the rare earth compound has the formula: $A_{1-b}B_bZ_{1-d}D_dMO_6$ where A is Al, Ga, In, Sc, Y, Ce, Pr, Nd, Pm, Sm, Eu, Gd, Tb, Dy, Ho, Er, Tm, Yb, Lu, Fe, Cr, Co, Mn, Bi, or a mixture thereof; b is 0 to about 0.5; Z is Hf, Ti, or a mixture thereof; D is Zr, Ce, Ge, Si, Ru, or a mixture thereof; d is 0 to about 0.5; and M is Ta, Nb, or a mixture thereof, the rare earth compound being a plurality of particles having a particle size distribution of D50 of about 0.2 μm to about 20 μm and D95 of about 10 μm to about 30 μm; and
   densifying the coating at a sintering temperature between about 1300° C. to about 1600° C.

2. The method of claim 1, wherein the sintering temperature is about 1300° C. to about 1450° C.

3. The method of claim 1, wherein the slurry further comprises a sintering aid.

4. The method of claim 1, further comprising:
prior to applying the slurry, forming a bond coating on the surface of the substrate such that the slurry is applied over the bond coating.

5. The method of claim 1, wherein the substrate is a ceramic matrix composite.

6. The method of claim 1, wherein the coating has a thickness of about 1 μm to about 1 mm.

7. The method of claim 1, wherein the coating is an external layer.

8. The method of claim 1, wherein b is 0, and wherein A consists of an element selected from the group consisting of Al, Ga, In, Sc, Y, Ce, Pr, Nd, Pm, Sm, Eu, Gd, Tb, Dy, Ho, Er, Tm, Yb, Lu, Fe, Cr, Co, Mn, Bi, and a mixture thereof.

9. The method of claim 1, wherein b is 0, and wherein A consists of an element selected from the group consisting of Al, Er, Sc, Sm, In, Ga, Ho, Y, and a mixture thereof.

10. The method of claim 1, wherein b is greater than 0 to about 0.5, wherein d is 0, wherein Z includes Hf, and wherein M includes Ta.

11. The method of claim 1, wherein A includes Al in combination with another element and wherein Z includes Hf such that the compound has the formula:

$Al_xA'_aB_bLn_{1-x-a-b}Hf_{1-t-d}Ti_tD_dMO_6$ where:
x is about 0.01 to about 0.99 such that Al is present in the compound;
A' is Ga, In, Sc, Y, Ce, Pr, Nd, Pm, Sm, Eu, Gd, Tb, Dy, Ho, Er, Tm, Yb, Lu, Fe, Cr, Co, Mn, Bi, or a mixture thereof;
a is 0 to about 0.99;
b is 0 to about 0.5, with 1-x-a-b being 0 to about 0.99 such that Ln is present in the compound;
Ln is Sc, Y, La, Ce, Pr, Nd, Pm, Sm, Eu, Gd, Tb, Dy, Ho, Er, Tm, ytterbium Yb, Lu, or a mixture thereof, and wherein Ln is different than A in terms of composition;
t is 0 to about 0.99;
D is Zr, Ce, Ge, Si, or a mixture thereof;
d is 0 to about 0.5;
the sum of t and d is less than 1 such that Hf is present in the compound; and
M is Ta, Nb, or a mixture thereof.

12. The method of claim 11, where b is 0, and where t is 0.

13. The method of claim 11, where d is 0, and where M is Ta.

14. The method of claim 1, wherein A includes Al and Ga in combination with another element and wherein Z includes Hf such that the compound has the formula:

$Al_xGa_yB_bLn_{1-x-y-b}Hf_{1-t-d}Ti_tD_dMO_6$ where:
x is about 0.01 to about 0.99 such that Al is present in the compound;
y is about 0.01 to about 0.99 such that Ga is present in the compound;
b is 0 to about 0.5, with 1-x-a-b being 0 to about 0.99 such that Ln is present in the compound;
Ln is Sc, Y, La, Ce, Pr, Nd, Pm, Sm, Eu, Gd, Tb, Dy, Ho, Er, Tm, ytterbium Yb, Lu, or a mixture thereof, and wherein Ln is different than A in terms of composition;
t is 0 to about 0.99;
D is Zr, Ce, Ge, Si, or a mixture thereof;
d is 0 to about 0.5;
the sum of t and d is less than 1 such that Hf is present in the compound; and
M is Ta, Nb, or a mixture thereof.

15. The method of claim 1, wherein the rare earth compound has the formula: $Al_{1-x-y}A'_xA''_yHfTaO_6$ where A' is Er, Sm, or a mixture thereof; x is about 0.3 to about 0.45; A'' is In, Ga, or a mixture thereof; y is about 0.15 to about 0.35; and (x+y) is about 0.5 to about 0.7 such that Al is present from about 0.3 to about 0.5.

16. The method of claim 1, wherein the rare earth compound has the formula: $Al_{1-x-y}Er_xGa_yHfTaO_6$ where x is about 0.4 to about 0.6; y is 0 to about 0.4; and (x+y) is about 0.5 to about 0.85 such that Al is present from about 0.15 to about 0.5.

17. The method of claim 1, wherein the rare earth compound has the formula: $Al_xSc_{1-x}HfTaO_6$ where x is 0.01 to 0.1 such that Al is present from 0.01 to 0.1 and Sc is present from 0.9 to 0.99.

18. A sintered coating on a surface of a substrate, the sintered coating comprising a rare earth compound and a sintering aid, wherein the rare earth compound has the formula: $A_{1-b}B_bZ_{1-d}D_dMO_6$ where A is Al, Ga, In, Sc, Y, Ce, Pr, Nd, Pm, Sm, Eu, Gd, Tb, Dy, Ho, Er, Tm, Yb, Lu, Fe, Cr, Co, Mn, Bi, or a mixture thereof; b is 0 to about 0.5; Z is Hf, Ti, or a mixture thereof; D is Zr, Ce, Ge, Si, Ru, or a mixture thereof; d is 0 to about 0.5; and M is Ta, Nb, or a mixture thereof; and wherein the sintering aid dissolves into the rare earth compound during sintering such that the sintering aid is undetectable in the sintered coating as a separate phase.

19. The method of claim 1, wherein between about 0.1 volume % to about 40 volume % of the rare earth compound is a plurality of particles having a particle size distribution of D50 of about 10 μm to about 30 μm and D95 of about 100 μm.

20. A method of forming a coating on a surface of a substrate, the method comprising:
applying a slurry onto the surface of the substrate to form a coating, wherein the slurry comprises a rare earth compound dispersed within a solvent, wherein the rare earth compound has the formula: $A_{1-b}B_bZ_{1-d}D_dMO_6$ where A is Al, Ga, In, Sc, Y, Ce, Pr, Nd, Pm, Sm, Eu, Gd, Tb, Dy, Ho, Er, Tm, Yb, Lu, Fe, Cr, Co, Mn, Bi, or a mixture thereof; b is 0 to about 0.5; Z is Hf, Ti, or a mixture thereof; D is Zr, Ce, Ge, Si, Ru, or a mixture thereof; d is 0 to about 0.5; and M is Ta, Nb, or a mixture thereof, the rare earth compound being a plurality of particles having a particle size distribution of D50 of about 0.2 μm to about 20 μm and D95 of about 10 μm to about 30 μm; and
densifying the coating at a sintering temperature.

* * * * *